(12) United States Patent  
Ying et al.

(10) Patent No.: US 9,197,270 B2
(45) Date of Patent: Nov. 24, 2015

(54) DOUBLE RING ANTENNA WITH INTEGRATED NON-CELLULAR ANTENNAS

(71) Applicant: Sony Corporation, Tokyo (JP)

(72) Inventors: Zhinong Ying, Lund (SE); Kun Zhao, Stockholm (SE); Shuai Zhang, Solna (SE); Sailing He, Stockholm (SE)

(73) Assignee: Sony Corporation, Tokyo (JP)

( * ) Notice: Subject to any disclaimer, the term of this patent is extended or adjusted under 35 U.S.C. 154(b) by 97 days.

(21) Appl. No.: 14/092,529

(22) Filed: Nov. 27, 2013

(65) Prior Publication Data

US 2015/0147984 A1    May 28, 2015

(51) Int. Cl.
*H01Q 1/24*    (2006.01)
*H04B 1/3827*    (2015.01)
*H01Q 13/10*    (2006.01)
*H01Q 5/35*    (2015.01)

(52) U.S. Cl.
CPC ............. *H04B 1/3827* (2013.01); *H01Q 1/243* (2013.01); *H01Q 5/35* (2013.01); *H01Q 13/10* (2013.01)

(58) Field of Classification Search
CPC ...................................................... H01Q 1/243
See application file for complete search history.

(56) References Cited

U.S. PATENT DOCUMENTS

| | | | | |
|---|---|---|---|---|
| 8,665,164 B2 * | 3/2014 | Hill et al. | | 343/767 |
| 9,014,761 B2 * | 4/2015 | Lee et al. | | 455/566 |
| 2010/0315389 A1 * | 12/2010 | Sorrell et al. | | 345/204 |
| 2011/0102274 A1 * | 5/2011 | Fujisawa | | 343/702 |
| 2011/0128190 A1 * | 6/2011 | Galeev | | 343/702 |
| 2011/0263289 A1 * | 10/2011 | Vance | | 455/550.1 |
| 2012/0019418 A1 * | 1/2012 | Wong et al. | | 343/702 |
| 2012/0133572 A1 * | 5/2012 | Hsu et al. | | 343/893 |
| 2013/0135158 A1 | 5/2013 | Faraone et al. | | |
| 2013/0194138 A1 * | 8/2013 | Hammond | | 343/702 |
| 2014/0028525 A1 * | 1/2014 | Ying | | 343/893 |
| 2014/0062801 A1 * | 3/2014 | Yong et al. | | 343/702 |
| 2014/0106684 A1 * | 4/2014 | Burns et al. | | 455/78 |
| 2014/0132457 A1 * | 5/2014 | Galeev | | 343/702 |
| 2014/0139379 A1 * | 5/2014 | Bolin et al. | | 343/702 |
| 2014/0168019 A1 * | 6/2014 | Hirobe et al. | | 343/720 |
| 2014/0375509 A1 * | 12/2014 | Vance et al. | | 343/702 |

FOREIGN PATENT DOCUMENTS

| | | |
|---|---|---|
| EP | 2 704 255 A1 | 3/2014 |
| KR | 2013-0022208 A | 3/2013 |
| WO | WO 2012/144197 A1 | 10/2012 |

OTHER PUBLICATIONS

European Search Report Corresponding to European Patent Application No. 14181376; Dated: Apr. 22, 2015; 6 Pages.

* cited by examiner

*Primary Examiner* — David Bilodeau
(74) *Attorney, Agent, or Firm* — Myers Bigel Sibley & Sajovec, P.A.

(57) ABSTRACT

Wireless electronic devices may include a ground plane, a double ring antenna and non-cellular antennas integrated within the double ring antenna. The double ring antenna may comprise first and second metal rings around the perimeter of a ground plane to operate as MIMO cellular antennas. At least one non-cellular antenna, such as a MIMO Wi-Fi antenna, may be integrated between the first and second metals rings on one or more sides of the wireless electronic device.

17 Claims, 13 Drawing Sheets f= 0.82 GHz f= 0.86 GHz f= 0.92 GHz f= 1.7 GHz f= 1.9 GHz f= 2.1 GHz

Frequency / GHz
Right hand with head

Frequency / GHz
Right hand with head

A radiation pattern of a double ring MIMO Wi-Fi antenna.

DOUBLE RING ANTENNA WITH INTEGRATED NON-CELLULAR ANTENNAS

FIELD

Embodiments of the present inventive concepts generally relate to the field of communications and, more particularly, to antennas and wireless electronic devices incorporating the same.

BACKGROUND

Antenna design for mobile devices is to a great extent a matter of fashion, and different antenna concepts are becoming popular as they allow for novel industrial designs. Also, many handsets use PIFA, Loop or ILA type antennas, but these antennas call for radio frequency (RF) transparent covers in order not to impact the radiation properties of the antennas. In many cases, it may be desirable to use as much metal as possible on the outside of the device. The robustness of the metal may help to reduce wear and tear and to provide a feeling of quality.

However, metal covers introduce new challenges to antenna design and user interaction issues. Also, integration of the metal covers with other antennas may be difficult.

SUMMARY

According to some embodiments, an antenna system of a wireless electronic device may include a first antenna ring extending around a perimeter of the wireless electronic device, a second antenna ring extending around the perimeter of the wireless electronic device spaced apart from the first antenna ring, and a first connector portion electrically connecting the first antenna ring to the second antenna ring at the perimeter of the wireless electronic device. The antenna system may also include a ground plane in the wireless electronic device. The first and second antenna rings may be spaced apart from the ground plane. The antenna system may further include a first port at the ground plane configured to feed a first electrical signal to the first antenna ring and a first ground element electrically connecting the first antenna ring to the ground plane.

According to some embodiments, a portion of the first antenna ring between the first port and the first ground element and a portion of the ground plane between the first ground element and the first port may form a first conductive pattern for the first electrical signal around a first slot. The first slot may be a first nonconductive space.

According to some embodiments, the antenna system may include a second port at the ground plane configured to feed a second electrical signal to the first antenna ring and a second ground element electrically connecting the first antenna ring to the ground plane. A portion of the ground plane between the second port and the second ground element, a portion of the first antenna ring between the second ground element and the first ground element, and a portion of the ground plane between the first ground element and the second port may form a second conductive pattern for the second electrical signal around a second slot. The second slot may comprise a second nonconductive space.

According to some embodiments, the antenna system may include a second connector portion electrically connecting the first antenna ring to the second antenna ring at the perimeter of the wireless electronic device. The first connector portion, the first antenna ring between the first and second connector portions, the second connector portion, and the second antenna ring between the second connector portion and the first connector portion may form a first integrated conductive pattern.

According to some embodiments, the antenna system may also include a third connector portion electrically connecting the first antenna ring to the second antenna ring at the perimeter of the wireless electronic device. The second connector portion, the first antenna ring between the second and third connector portions, the third connector portion, and the second antenna ring between the third connector portion and the second connector portion may form a second integrated conductive pattern.

According to some embodiments, the antenna system may further include a ground element electrically connected to the ground plane at the second connector portion and configured to reduce coupling between the first and second integrated conductive patterns.

According to some embodiments, the perimeter of the wireless electronic device may surround first and second primary surfaces of the wireless electronic device. The first or second primary surface may include a display. The first antenna ring may contact the first primary surface and the second antenna ring may contact the second primary surface.

According to some embodiments, the wireless electronic device may include a ground plane and a double ring antenna. The double ring antenna may include a first antenna ring extending around a perimeter of the ground plane and spaced apart from the ground plane, a second antenna ring extending around the perimeter of the ground plane and spaced apart from the first antenna ring and the ground plane, a first connector portion electrically connecting the first antenna ring to the second antenna ring and a transceiver circuit coupled to the ground plane and configured to provide a first electrical signal and a second electrical signal to ports of the double ring antenna.

According to some embodiments, the double ring antenna may be configured to operate with the transceiver circuit as a multiple-in-multiple-out (MIMO) antenna.

According to some embodiments, the double-ring antenna may be configured to operate, responsive to the first and second electrical signals from the transceiver circuit, as a half wave antenna for a long term evolution (LTE) high band, a half wave antenna for an LTE low band, and/or a full wave antenna for the LTE high band.

According to some embodiments, the wireless electronic device may include a first port at the ground plane configured to feed the first electrical signal from the transceiver circuit to the first antenna ring and a first ground element electrically connecting the first antenna ring to the ground plane. The first antenna ring between the first port and the first ground element and the ground plane between the first ground element and the first port may form a first conductive pattern for the first electrical signal around a first slot. The first conductive pattern and the first slot may define a first cellular antenna configured to radiate a third electrical signal responsive to the first electrical signal.

According to some embodiments, the wireless electronic device may include a second port at the ground plane configured to feed the second electrical signal from the transceiver circuit to the first antenna ring and a second ground element electrically connecting the first antenna ring to the ground plane. The ground plane between the second port and the second ground element, the first antenna ring between the second ground element and the first ground element, and the ground plane between the first ground element and the second port may form a second conductive pattern for the second electrical signal around a second slot. The second conductive pattern and the second slot may define a second cellular antenna configured to radiate a fourth signal responsive to the second electrical signal.

According to some embodiments, the first cellular antenna may be configured to operate with the transceiver circuit as a diversity antenna, and the second cellular antenna may be configured to operate with the transceiver circuit as a main antenna according to a carrier aggregation standard.

According to some embodiments, the transceiver circuit, the first cellular antenna and the second cellular antenna may be configured to provide communications for the wireless electronic device via a plurality of frequency bands according to a long term evolution (LTE)-Advanced standard.

According to some embodiments, the wireless electronic device may also include a second connector portion electrically connecting the first antenna ring to the second antenna ring at the perimeter of the wireless electronic device. The first connector portion, the first antenna ring between the first and second connector portions, the second connector portion, and the second antenna ring between the second connector portion and the first connector portion may form a third conductive pattern around a first integrated nonconductive space. The third conductive pattern and the first integrated nonconductive space may define a first non-cellular antenna. The wireless electronic device may further include a third port configured to feed a fifth electrical signal from the transceiver circuit to the third conductive pattern.

According to some embodiments, the wireless electronic device may also include a third connector portion electrically connecting the first antenna ring to the second antenna ring at the perimeter of the wireless electronic device. The second connector portion, the first antenna ring between the second and third connector portions, the third connector portion, and the second antenna ring between the third connector portion and the second connector portion may form a fourth conductive pattern around a second integrated nonconductive space. The fourth conductive pattern and the second integrated nonconductive space may define a second non-cellular antenna. The wireless electronic device may further include a fourth port configured to feed a sixth electrical signal from the transceiver circuit to the fourth conductive pattern.

According to some embodiments, the transceiver circuit, the first non-cellular antenna and the second non-cellular antenna may be configured to provide communications for the wireless electronic device according to a Wi-Fi standard and/or Bluetooth® standard.

According to some embodiments, the first non-cellular antenna and the second non-cellular antenna may be configured to operate with the transceiver circuit as a multiple-in-multiple-out (MIMO) antenna.

Other devices and/or systems according to embodiments of the inventive concepts will be or become apparent to one with skill in the art upon review of the following drawings and detailed description. It is intended that all such additional devices and/or systems be included within this description, be within the scope of the present inventive concepts, and be protected by the accompanying claims. Moreover, it is intended that all embodiments disclosed herein can be implemented separately or combined in any way and/or combination.

DETAILED DESCRIPTION

Figure 1:
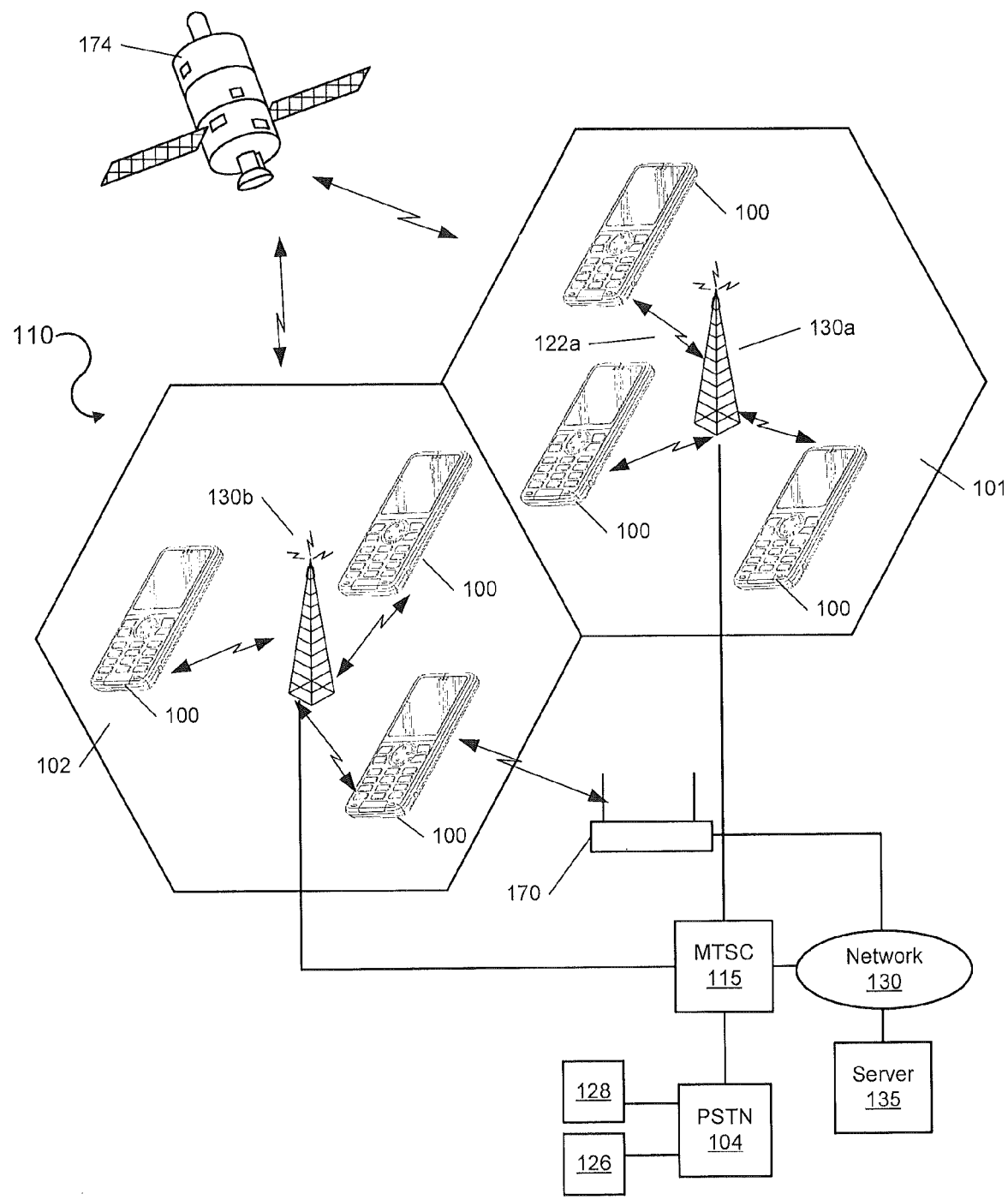
FIG. 1 is a schematic illustration of a wireless communications network that provides service to wireless electronic devices, according to various embodiments of the present inventive concepts.

The present inventive concepts now will be described more fully with reference to the accompanying drawings, in which embodiments of the inventive concepts are shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein the term "and/or" includes any and all combinations of one or more of the associated listed items.

Spatially relative terms, such as "above," "below," "upper," "lower," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For purposes of illustration and explanation only, various embodiments of the present inventive concepts are described herein in the context of "wireless electronic devices." Among other devices/systems, wireless electronic devices may include multi-band wireless communication terminals (e.g., portable electronic devices/wireless terminals/mobile terminals/terminals) that are configured to carry out cellular communications (e.g., cellular voice and/or data communications) in more than one frequency band. It will be understood, however, that the present inventive concepts are not limited to such embodiments and may be embodied generally in any device and/or system that is configured to transmit and receive in one or more frequency bands. Moreover, the terms "about" and "substantially," as described herein, mean that the recited number or value can vary by +/−25%.

Antenna design involves fashion and function as more metal is introduced to the outside of mobile devices. Metal covers and user body loss introduce challenges to the design of antennas used in wireless communication networks. Referring to FIG. 1, a diagram is provided of a wireless communications network 110 that supports communications in which wireless electronic devices 100 can be used according to various embodiments of the present inventive concepts. The network 110 includes cells 101, 102 and base stations 130a, 130b in the respective cells 101, 102. Networks 110 are commonly employed to provide voice and data communications to subscribers using various radio access standards/technologies. The network 110 may include wireless electronic devices 100 that may communicate with the base stations 130a, 130b. The wireless electronic devices 100 in the network 110 may also communicate with a Global Positioning System (GPS) satellite (or satellites) 174, a local wireless network 170, a Mobile Telephone Switching Center (MTSC) 115, and/or a Public Service Telephone Network (PSTN) 104 (i.e., a "landline" network).

The wireless electronic devices 100 can communicate with each other via the Mobile Telephone Switching Center (MTSC) 115. The wireless electronic devices 100 can also communicate with other devices/terminals, such as terminals 126, 128, via the PSTN 104 that is coupled to the network 110. As also shown in FIG. 1, the MTSC 115 may be coupled to a computer server 135 via a network 130, such as the Internet.

The network 110 is organized as cells 101, 102 that collectively can provide service to a broader geographic region. In particular, each of the cells 101, 102 can provide service to associated sub-regions (e.g., regions within the hexagonal areas illustrated by the cells 101, 102 in FIG. 1) included in the broader geographic region covered by the network 110. More or fewer cells can be included in the network 110, and the coverage area for the cells 101, 102 may overlap. The shape of the coverage area for each of the cells 101, 102 may be different from one cell to another and is not limited to the hexagonal shapes illustrated in FIG. 1. Each of the cells 101, 102 may include an associated base station 130a, 130b. The base stations 130a, 130b can provide wireless communications between each other and the wireless electronic devices 100 in the associated geographic region covered by the network 110.

Each of the base stations 130a, 130b can transmit/receive data to/from the wireless electronic devices 100 over an associated control channel. For example, the base station 130a in cell 101 can communicate with one of the wireless electronic devices 100 in cell 101 over the control channel 122a. The control channel 122a can be used, for example, to page the wireless electronic device 100 in response to calls directed thereto or to transmit traffic channel assignments to the wireless electronic device 100 over which a call associated therewith is to be conducted.

The wireless electronic devices 100 may also be capable of receiving messages from the network 110 over the respective control channels 122a. In various embodiments, the wireless electronic devices 100 receive Short Message Service (SMS), Enhanced Message Service (EMS), Multimedia Message Service (MMS), and/or Smartmessaging™ formatted messages.

The GPS satellite 174 can provide GPS information to the geographic region including cells 101, 102 so that the wireless electronic devices 100 may determine location information. The network 110 may also provide network location information as the basis for the location information applied by the wireless electronic devices 100. In addition, the location information may be provided directly to the server 135 rather than to the wireless electronic devices 100 and then to the server 135. Additionally or alternatively, the wireless electronic devices 100 may communicate with the local wireless network node 170 (e.g., a Wi-Fi router).

Wireless communications network 110 may utilize the long term evolution (LTE)-Advanced standard. An LTE-Advanced mobile device's capability may benefit from using two high performance cellular antennas. For example, good transceiver performance of two cellular antennas may be useful or necessary for dual transceiver multiple-in-multiple out (MIMO) schemes and/or for carrier aggregation in the different operating bands. Future LTE MIMO mobile terminals may need to integrate the MIMO Wi-Fi antennas while remaining compact.

Figure 2A:
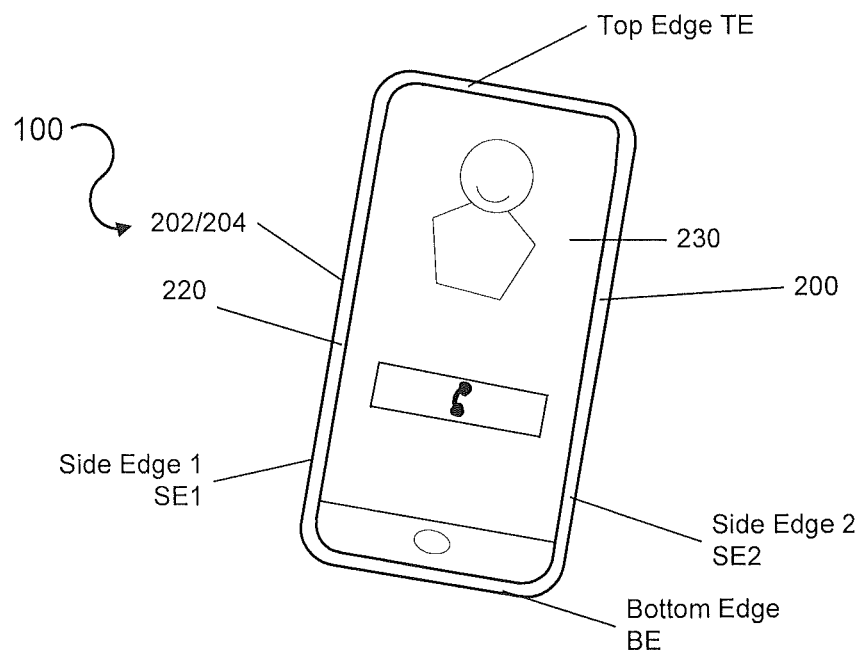
FIGS. 2A and 2B illustrate front and rear views, respectively, of a wireless electronic device, according to various embodiments.
Figure 2B:
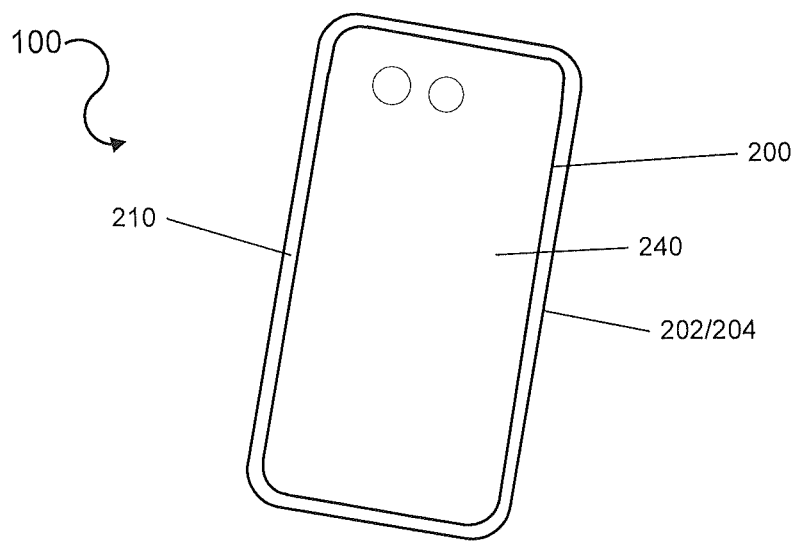

Embodiments described herein may integrate MIMO LTE antennas and MIMO Wi-Fi antennas onto a metal frame of a wireless electronic device. The integrated antennas may occupy a relatively small space inside and/or on the outside of the wireless electronic device. An example wireless electronic device 100 is shown in FIGS. 2A and 2B. FIGS. 2A and 2B illustrate front and rear views, respectively, of a wireless electronic device 100, according to various embodiments of the present inventive concepts. Wireless electronic device 100 may have a metal frame with a double ring antenna 200 that extends continuously around device 100, including around the top edge TE, side edge 1 SE1, bottom edge BE and side edge 2 SE2 of the device 100. A first metal ring 210 of the double ring antenna 200 may surround the device 100. The first metal ring 210 may contact a back face 240 of the device 100. A second metal ring 220 may be separated from first metal ring 210 and surround the device 100. The second metal ring 220 may contact a front face 230 of the device 100. In some cases, the front face 230 may have a display. In alternate embodiments, second metal ring 220 may contact front face 230.

According to various embodiments, metal rings 210 and 220 may be used to provide certain types of antennas configured for wireless communications. Metal rings 210 and/or 220 may be configured to form a multi-band antenna and/or may be configured to communicate using multiple cellular frequencies, including carrier aggregation.

According to various embodiments, the metal rings 210 and 220 may be round or planar in shape. In some embodiments metal bands 210 and 220 may be thin, flat rings on an outer surface of the perimeter facing away from the ground plane. In other embodiments, metal rings 210 and 220 may be curved or slightly rounded on the outer surface. Metal rings 210 and 220, may include flat, curved, serrated or beveled edges.

The metal rings 210 and 220 may be continuous around the perimeter of the device 100 and free of holes, slots or gaps to interrupt the continuity of the metal rings at any point along the metal ring.

According to various embodiments, the metal rings 210 and 220 may be made of only metal. The metal may be comprised of a single metal or multiple metals in a metal alloy. The metal may also include an alloy that includes non-metals such as carbon. The metal rings may be naturally metallic in color, or may be colored. In some cases, some non-metal materials may be embedded on, between or placed on portions of the metal rings. However, the metal rings will not be discontinuous at any point on the perimeter of the metal rings 210 and 220 due to the embedded or places non-metal elements. For example, metal rings 210 and 220 may be free of non-metal (e.g., plastic, glass, ceramic, etc.) discontinuities and may thus provide a more continuous metal look and/or feel to the exterior of the wireless electronic device 100. The antenna functionality of the metal rings may be maintained. Metal elements may also be placed on the metal rings 210 and 220 as long as they are integrated in the antennas electrical design. In some alternative embodiments, there may be discontinuities introduced into metal ring 210 and/or metal ring 220.

According to some embodiments, the metal rings 210 and 220 may be around a corner edge of the device 100, the corner formed between a primary surface, such as a back face 240 and the edge of the device 100, or a secondary surface, such as a front face 230 and the edge of the device. In some embodiments, metal rings 210 and/or 220 may be in contact with the back 240 and/or front 230 surfaces of the device 100, respectively. In some embodiments, metal rings 210 and/or 220 may be located on the back 240 and/or front 230 surfaces of the device 100, respectively. In other embodiments, the metal rings 210 and 220 may be raised or lowered with respect to the back 240 and/or front 230 surfaces of the device 100.

In yet other embodiments, the edges of the metal rings 210 and 220 may be covered by the external back face 240 and/or external front face 230. In some embodiments, external back face 240 of the wireless electronic device 100 may overlap/cover at least a portion of metal rings 210 and 220. For example, if the metal rings 210 and 220 form the outer surface of edges TE, SE and BE, then at least a portion of the metal rings 210, 220 may be recessed within a perimeter of the back face 240, and may be between the back face 240 and the front face 230 (e.g., a display screen) of the wireless electronic device 100. Accordingly, although portions of the metal rings 210 and 220 may be outside the perimeter of the external faces 230 and/or 240, the metal rings 210 and 220, or portions thereof, may alternatively not be visible from certain viewing angles or may be partially concealed by faces 230 and/or 240.

According to some embodiments, the two metal rings 210 and 220 may be symmetrical in length, appearance, and/or placement on the perimeter of the wireless electronic device 100. Each of metal rings 210 and 220 may cover all of side edges SE1 and SE2, top edge TE and bottom edge BE. In other embodiments, the two metal rings 210 and 220 may also be slightly asymmetrical or different in thickness or material.

Figure 2C:
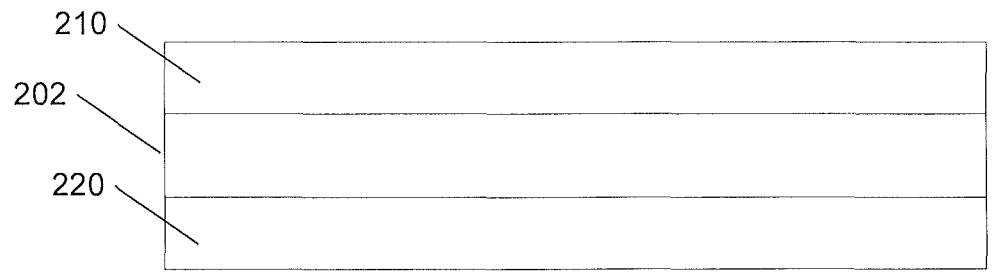
FIGS. 2C and 2D illustrate a side view of a wireless electronic device, according to various embodiments.
Figure 2D:
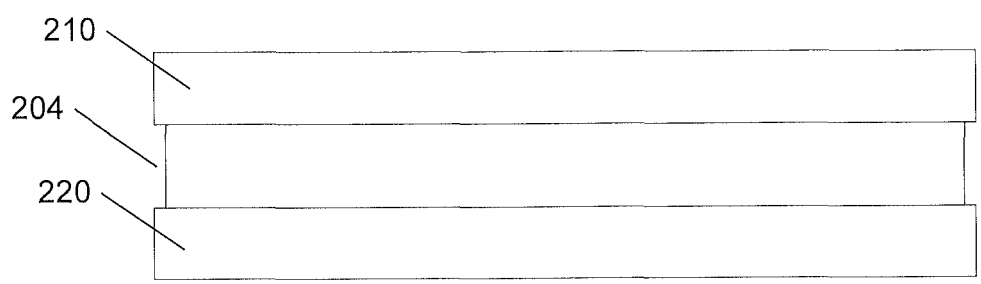

The metal rings 210 and 220 may be separated by a strip 202, as shown in FIG. 2C, or a gap 204, as shown in FIG. 2D. In FIGS. 2C and 2D, the device 100 may be considered to be face down. The strip 202 or gap 204 may continue around the perimeter of a housing surrounding ground plane 470 or along defined portions of the perimeter. The metal rings 210 and 220 and strip 202 may be integrated to collectively define or form an outer perimeter of a housing of the wireless electronic device 100. The strip 202 or gap 204 may serve to isolate metal ring 210 from metal ring 220 such that non-cellular antennas may be formed around the strip 202 or gap 204. Strip 202 may be made from a non-conductive material such as plastic, glass, ceramic or other non-metal. The isolation of the metal rings 210 and 220 from each other may completely sever the electric/galvanic/metal connection around the perimeter of the device 100, except for a few connector portions shown later in FIGS. 4 and 5.

Figure 3:
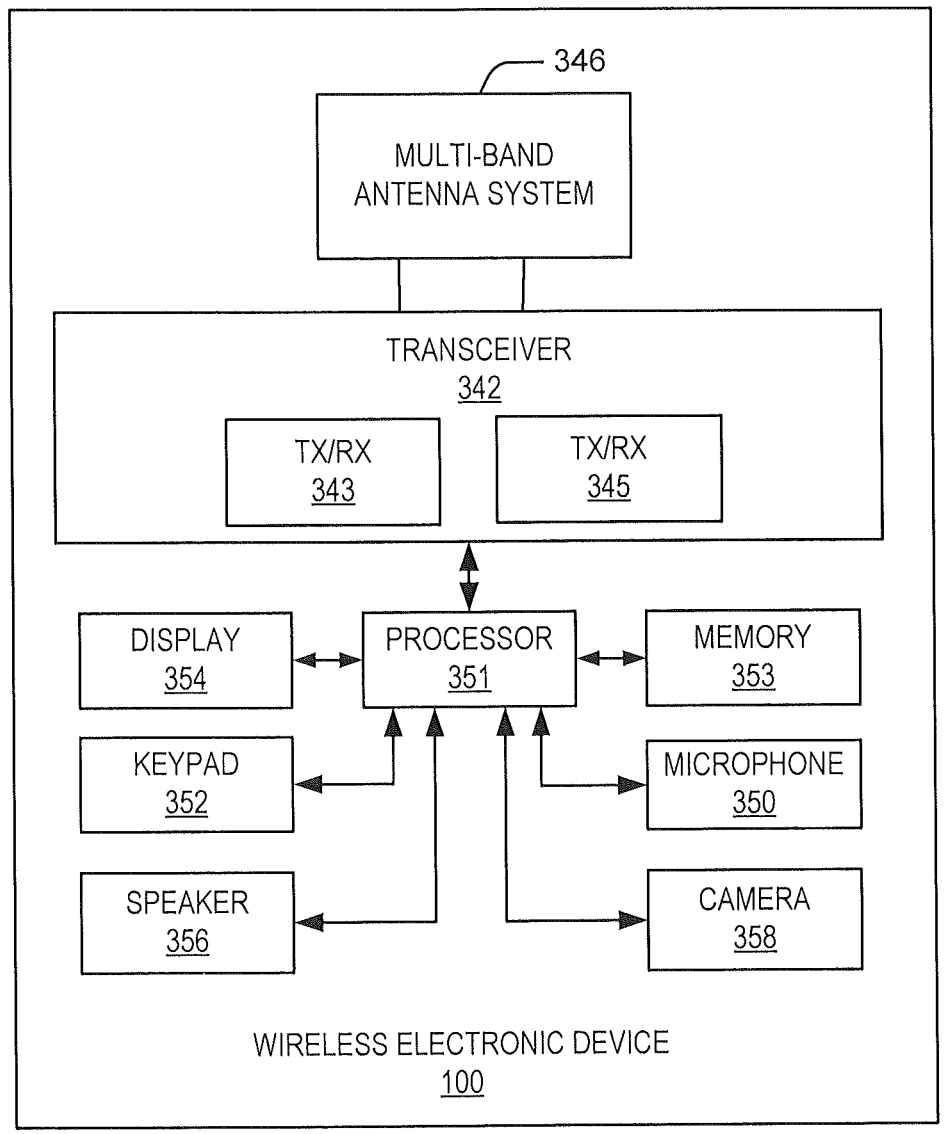
FIG. 3 is a block diagram illustrating a wireless electronic device, according to various embodiments.

FIG. 3 illustrates a block diagram of a wireless electronic device 100, according to various embodiments. As illustrated in FIG. 3, a wireless electronic device 100 may include a multi-band antenna system 346, a transceiver 342, and a processor 351. The wireless electronic device 100 may further include a display 354, keypad 352, speaker 356, memory 353, microphone 350, and/or camera 358. Multi-band antenna system 346 may include double ring antenna 200 and any non-cellular antennas integrated between metal rings 210 and 220.

A transmitter portion of the transceiver 342 converts information, which is to be transmitted by the wireless electronic device 100, into electromagnetic signals suitable for radio communications (e.g., to the network 110 and/or to local wireless network node 170 illustrated in FIG. 1). A receiver portion of the transceiver 342 demodulates electromagnetic signals, which are received by the wireless electronic device 100 from the network 110 and/or from local wireless network node 170 for processing at processor 351 to provide the information contained in the signals in a format understandable to a user of the wireless electronic device 100. The transceiver 342 may include transmit/receive circuitry (TX/RX) that provides separate communication paths for supplying/receiving RF signals to different radiating elements of the multi-band antenna system 346 via their respective RF feeds. Accordingly, when the multi-band antenna system 346 includes at least two active antenna elements (e.g., the metal ring antennas 210, 220), the transceiver 342 may include two transmit/receive circuits 343, 345 connected to different ones of the antenna elements via the respective RF feeds.

The transceiver 342, in operational cooperation with the processor 351, may be configured to communicate according to at least one radio access technology in two or more frequency ranges. The at least one radio access technology may include, but is not limited to, WLAN (e.g., 802.11/WiFi), WiMAX (Worldwide Interoperability for Microwave Access), TransferJet, 3GPP LTE (3rd Generation Partnership Project Long Term Evolution), 4G, Time Division LTE (TD LTE), Universal Mobile Telecommunications System (UMTS), Global Standard for Mobile (GSM) communication, General Packet Radio Service (GPRS), enhanced data rates for GSM evolution (EDGE), DCS, PDC, PCS, Code Division Multiple Access (CDMA), wideband-CDMA, and/or CDMA2000. The radio access technology may operate using such frequency bands as 700-800 Megahertz (MHz), 824-894 MHz, 880-960 MHz, 1710-1880 MHz, 1820-1990 MHz, 1920-2170 MHz, 2300-2400 MHz, and 2500-2700 MHz. Other radio access technologies and/or frequency bands can also be used in embodiments according to the inventive concepts. Various embodiments may use metal ring antennas 210 and 220, and other antennas between metal rings 210 and 220, to provide coverage for non-cellular frequency bands such as Global Positioning System (GPS), WLAN, and/or Bluetooth® frequency bands. As an example, in various embodiments according to the inventive concepts, the local wireless network 170 (illustrated in FIG. 1) may be a WLAN compliant network. In various other embodiments according to the inventive concepts, the local wireless network node 170 may be a Bluetooth® compliant interface.

The wireless electronic device 100 is not limited to any particular combination or arrangement of the keypad 352 and the display 354. As an example, it will be understood that the functions of the keypad 352 and the display 354 can be provided by a touch screen, such as the touch screen of a display on front face 230, through which the user can view information, such as computer displayable documents, provide input thereto, and otherwise control the wireless electronic device 100. Additionally or alternatively, the wireless electronic device 100 may include a separate keypad 352 and display 354.

Memory 353 can store computer program instructions that, when executed by the processor circuit 351, carry out the operations described herein and shown in the figures. As an example, the memory 353 can be non-volatile memory, such as EEPROM (flash memory), that retains the stored data while power is removed from the memory 353.

Figure 4:
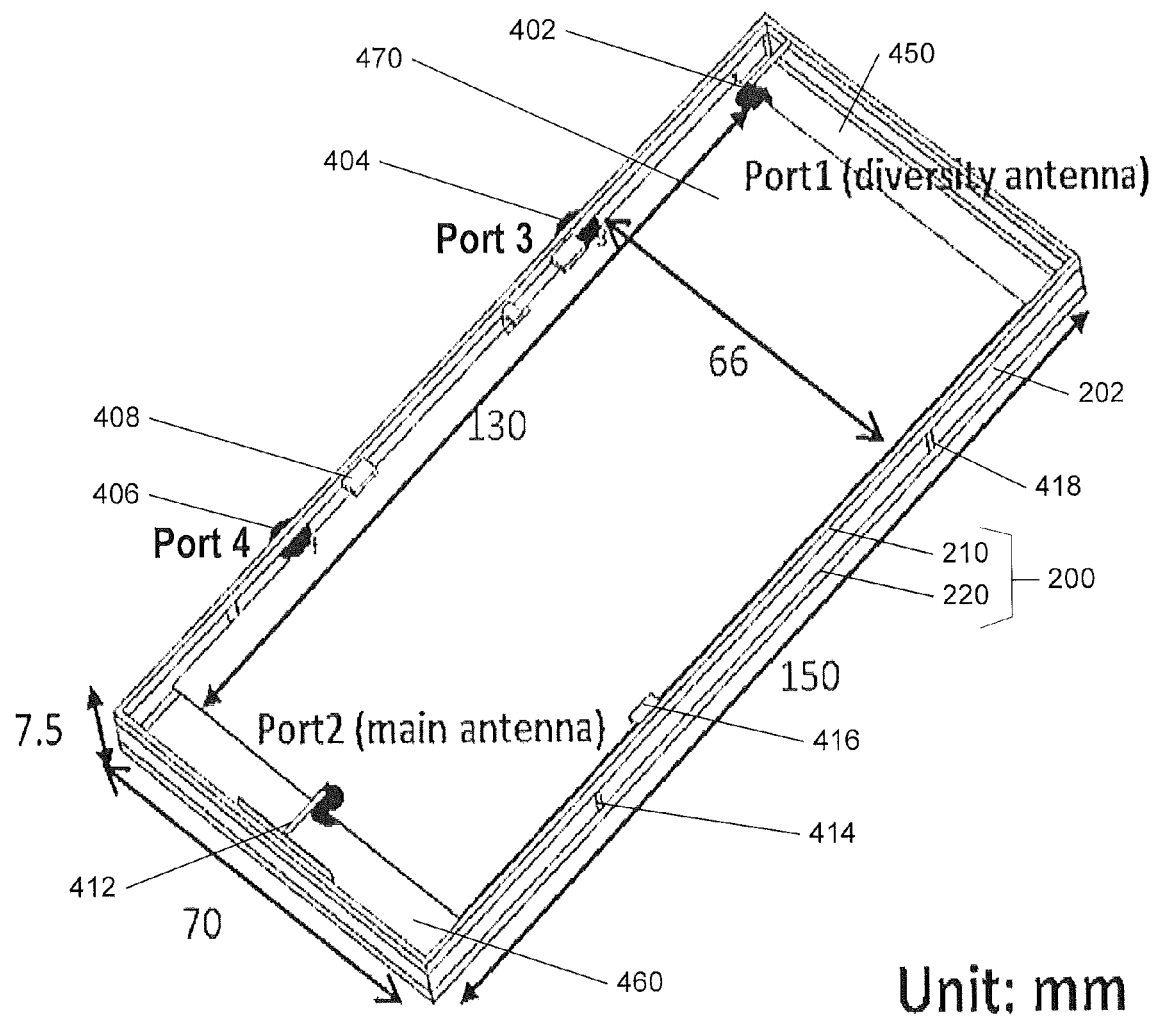
FIG. 4 illustrates a view of a wireless electronic device having a double ring antenna, according to various embodiments.

As shown in FIG. 4, the double ring antenna 200 may have two metal rings 210 and 220 around the handset that are arranged with a slot, such as slot 450 or slot 460, between the metal rings 210 and/or 220 and the ground plane 470 to operate as LTE antennas. One of the advantages of a slot antenna is that it has less body loss. A multiple-in-multiple-out (MIMO) antenna, such as a MIMO LTE antenna, may be formed by the double metal rings 210 and 220. Metals rings 210 and 220 may be parallel and separated from one another by strip 202 or an air gap 204. Connector portions 414 and 418 may connect metal rings 210 and 212.

Figure 6:
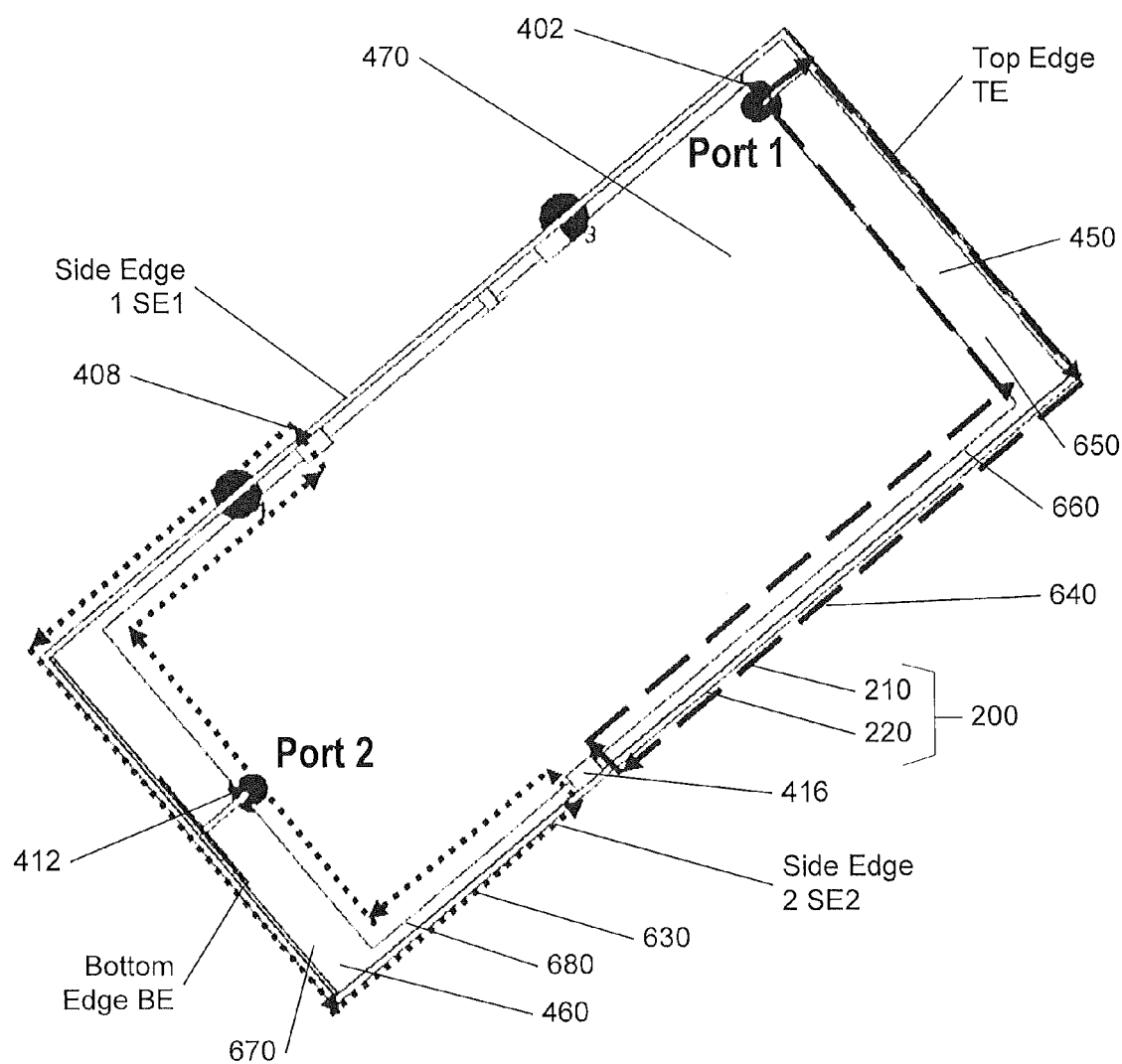
FIG. 6 illustrates a view of a wireless electronic device having a double ring antenna, according to various embodiments.

According to some embodiments, Port 1 402 may feed (e.g., straight fed) metal ring 210 and ground element 416 may ground a portion of the metal ring 210, or isolate the current flow to reduce the coupling, such that metal ring 210 can operate as a diversity LTE cellular antenna in a double ring antenna metal design. In FIG. 6, the radiator of diversity LTE cellular antenna in the lower band (e.g., less than 1 GHz) is shown by dashed line 630. Metal ring 210 may be used mainly as the radiator, which has the path length along the edge of around λ/2.

Metal ring 210 may be straight fed or C-fed at Port 2 412 and ground elements 408 and 416 may isolate a portion of the metal ring 210 such that metal ring 210 operates as a main LTE cellular antenna in a double ring antenna metal design, as shown by dashed line 640 in FIG. 6. FIG. 6 shows Ports 1 402 and 2 412 feeding the double ring antenna 200 to operate in the lower LTE band. Feeds and grounding elements may be arranged on the device 100 as useful/necessary to form cellular antennas from metal rings 210 and 220, such as for the LTE-Advanced standard or any other cellular, carrier aggregation or MIMO standard. Port 3 404 and Port 4 406 may feed additional antennas.

FIG. 6 illustrates slots 450 and 460. Slot 450 may be a space, separation, air gap or nonconductive material between ground plane 470 and metal rings 210 and 220. Slot 450 may be any length, width and/or shape necessary to radiate signals at cellular frequency bands. For example, slot 450 may include a larger space 650 between ground plane 470 and metal rings 210 and 220 at a top edge TE. Slot 450 may also include a thinner space 660 between ground plane 470 and metal rings 210 and 220 at a side edge SE2.

Port 1 402 may receive an electrical excitation signal from transceiver 342 to create an electrical path or conductive pattern that follows dashed line 640. Slot 450 radiates signals formed by the electrical path 640. Electrical path 640 may be generally described as proceeding from Port 1 402 to metal ring 210 at top edge TE. The electrical path 640 may continue along metal ring 210 on side edge 2 SE2. Electrical path 640 may pass from metal ring 210 through ground element 416 to ground plane 470. Electrical path 640 may continue along ground plane 470, or an edge of ground plane 470, next to space 660 and space 650, returning to Port 1 402.

Slot 450 and the conductive pattern shown by electrical path 640 may define a cellular antenna that is configured to radiate signals at a cellular frequency band. For example, slot 450 and the conductive pattern of electrical path 640 may be configured to radiate signals received from transceiver 342 on an LTE low band frequency, operating as a diversity cellular antenna. Slot 450 and the conductive pattern may be used as the radiator, in which the electrical path 640 has a length of around λ.

Slot 460 may be a space, separation, air gap or nonconductive material between ground plane 470 and metal rings 210 and 220. Slot 460 may be any length, width and/or shape necessary to radiate signals at cellular frequency bands. For example, slot 460 may include a larger space 670 between ground plane 470 and metal rings 210 and 220 at a bottom edge BE. Slot 460 may also include a thinner space 680 between ground plane 470 and metal rings 210 and 220 at a side edge SE2 or side edge SE1.

Port 2 402 may receive an electrical excitation signal from transceiver 342 to create an electrical path or conductive pattern that follows dashed line 630. Slot 460 radiates signals formed by the electrical path 630. Electrical path 630 may be generally described as proceeding along a path formed by Port 2 412, ground plane 470, ground element 408, metal ring 210 and ground element 416, as illustrated in FIG. 6.

Slot 460 and the conductive pattern shown by electrical path 630 may define a cellular antenna that is configured to radiate signals at a cellular frequency band equivalent to or different than slot 450. For example, slot 460 and the conductive pattern may be configured to radiate signals received from transceiver 342 on an LTE low band frequency, operating as a main cellular antenna with the diversity cellular antenna (slot 450 and pattern 640), such as according to an LTE MIMO standard. Any combination of connector portions 414, 418, 540, 550 and 560 may be made of metal or any other conductive material. These connector portions may provide a structure for non-cellular antennas and electrically connect metal ring 210 to metal ring 220 for operation in a cellular high band, such as in an LTE high band frequency. Slot 460 may be used as a radiator, in which the electrical path 630 has a length of around λ.

Figure 5:
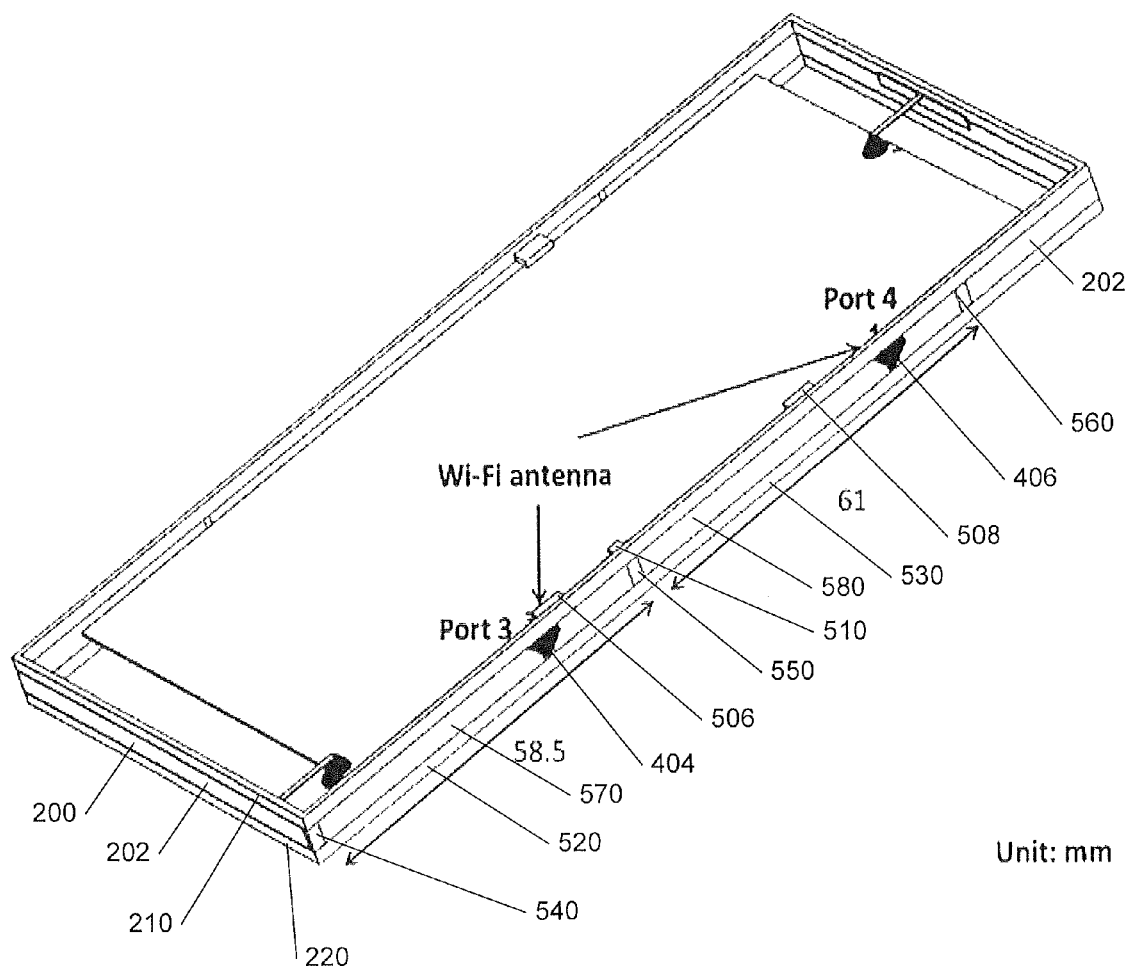
FIG. 5 illustrates a different view of a wireless electronic device having a double ring antenna, according to various embodiments.

FIG. 5 is a view of device 100 rotated 180° clockwise from the view of FIG. 4. In FIG. 5, non-cellular antennas, such as Wi-Fi antennas 520 and 530, may be integrated in a conductive pattern between the metal rings 210 and 220 to radiate non-cellular signals. This structure is compact, which does not require any extra space. As discussed above, connector portions 540, 550 and 560 may be used to connect metal rings 210 and 220 and to separate and/or separately define non-cellular antennas, such as Wi-Fi antennas 520 and 530.

Figure 7:
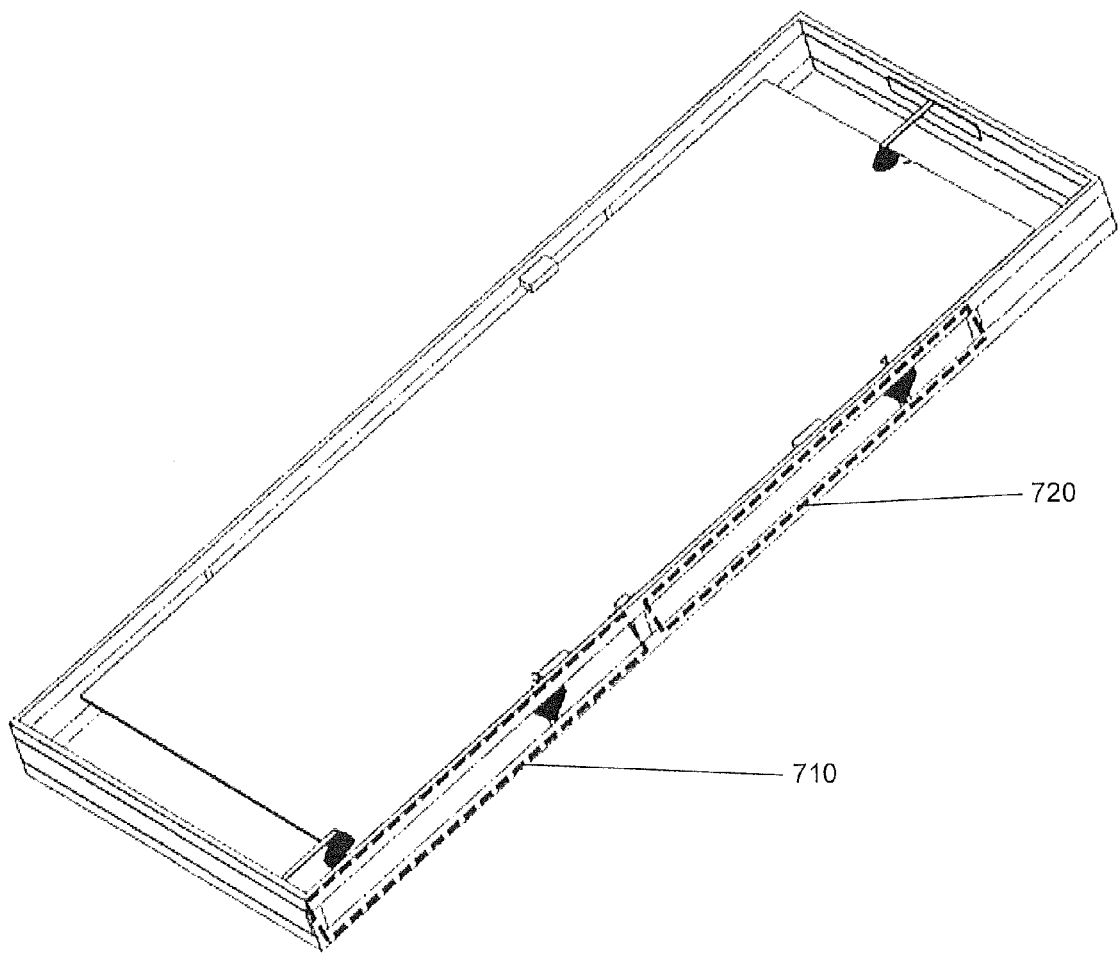
FIG. 7 illustrates a different view of a wireless electronic device having a double ring antenna, according to various embodiments.

According to some embodiments, Wi-Fi antenna 520 may radiate signals at a Wi-Fi frequency band based on an electrical signal received from transceiver 342 that forms an electrical path or conductive pattern shown by dashed line 710 in FIG. 7. The electrical path 710 includes connector portions 540 and 550 as well as portions of metal rings 210 and 220 between connector portions 540 and 550. Port 3 404 may feed the electrical signal to Wi-Fi antenna 520 and ground element 506 may ground Wi-Fi antenna 520. Strip portion 570 may be a non-conductive material such as plastic or glass. Strip portion 570 may be part of a housing of the wireless electronic device 100. In some embodiments, Wi-Fi antenna 520 may be defined by and radiate signals from a slot or nonconductive space defined or formed by an integrated conductive pattern of electrical path 710.

Wi-Fi antenna 530 may radiate signals at a Wi-Fi frequency band, equivalent to or different than the band of Wi-Fi antenna 530, based on an electrical signal received from transceiver 342 that forms an electrical path or conductive pattern shown by dashed line 720. The conductive pattern of electrical path 720 includes connector portions 550 and 560 as well as portions of metal rings 210 and 220 between connector portions 550 and 560. Port 4 406 may feed the electrical signal to Wi-Fi antenna 530 and ground element 508 may ground Wi-Fi antenna 530. Strip portion 580 may be a non-conductive material such as plastic or glass. Strip portion 580 may also be part of a housing of the wireless electronic device 100. In some embodiments, Wi-Fi antenna 530 may be defined by and radiate signals from a slot or nonconductive space defined or formed by an integrated conductive pattern of electrical path 720. A ground element 510 from connector portion 550, metal ring 210 and/or metal ring 220 between the two Wi-Fi antennas 520 and 530 may help to reduce the coupling between them.

In some embodiments, Wi-Fi antennas 520 and 530 are fed signals from transceiver 342 such that Wi-Fi antennas 520 and 530 operate according to a MIMO Wi-Fi standard. The sizes of the antennas and the positions of the feeds and connectors may be adjusted for functional and performance purposes, according to some embodiments. For example, in some embodiments, Wi-Fi antennas 520 and 530 may be configured to be about 60 mm in length. The electrical paths 710 and 720 may be configured to have a length λ such that the slots of Wi-Fi antennas 520 and 530 radiate at a corresponding resonant frequency. In some cases, the lengths of electrical paths 710 and 720 are adjusted by changing the distance between connector portions 540, 550 and 560.

Wi-Fi antennas 520 and 530 may be configured to operate in slot mode. However, the size and shape of the slots are not limited to the embodiments provided herein. In some cases, the slots may include corners of the wireless electronic device 100 and may or may not be located on a same side of the wireless electronic device 100. By using the basic order mode and higher order mode of the slots, the Wi-Fi antenna can cover 2.4 GHz band and 5.2 GHz band, respectively.

Wi-Fi antennas 520-530 may be a wireless (WiFi), Wireless Local Area Network (WLAN) (e.g., 802.11), millimeter wave and/or Bluetooth® antenna or any other non-cellular antenna that uses short-range protocols. A Wi-Fi antenna may be single-band or dual-band WiFi antennas operating at frequency bands of about 2.4 GHz and/or about 5.0 GHz. Both the MIMO LTE antennas and the MIMO Wi-Fi antennas may have relatively low correlation and relatively high efficiency. The MIMO cellular antenna can cover LTE bands from 830 MHz to 930 MHz and from 1700 MHZ to 2100 MHz. The MIMO Wi-Fi antennas can cover WLAN bands from 2.4 GHz to 2.5 GHz and from 5.2 GHz to 5.8 GHz. The positions of Port 3 404 and Port 4 406 and ground elements 506 and 508 may be adjusted based on the desired frequency bands. Connector portions 540, 550 and 560, or more or less connector portions, slots, strips or gaps may be used to separate and/or define non-cellular antennas between the metal rings 210 and 220 as useful/necessary. The non-cellular antennas may also be located on a strip of any combination of conductive and non-conductive material, such as on strip 202.

In some embodiments, the antennas may be electrically and/or physically coupled to matching circuits, respectively. The matching circuits may each be the same type of matching circuit or may be different types of matching circuits. For example, the matching circuits may provide capacitive feeds for the antennas. In other words, the matching circuit may be electrically, but not physically, coupled to the antenna. In contrast, some matching circuits may provide a direct feed for the antenna. In another example, the matching circuit may provide an inductive feed (which is physically connected to the ground plane 470) for the antenna. It will be understood, however, that any antenna may alternatively use an inductive feed or a direct feed.

Figure 8:
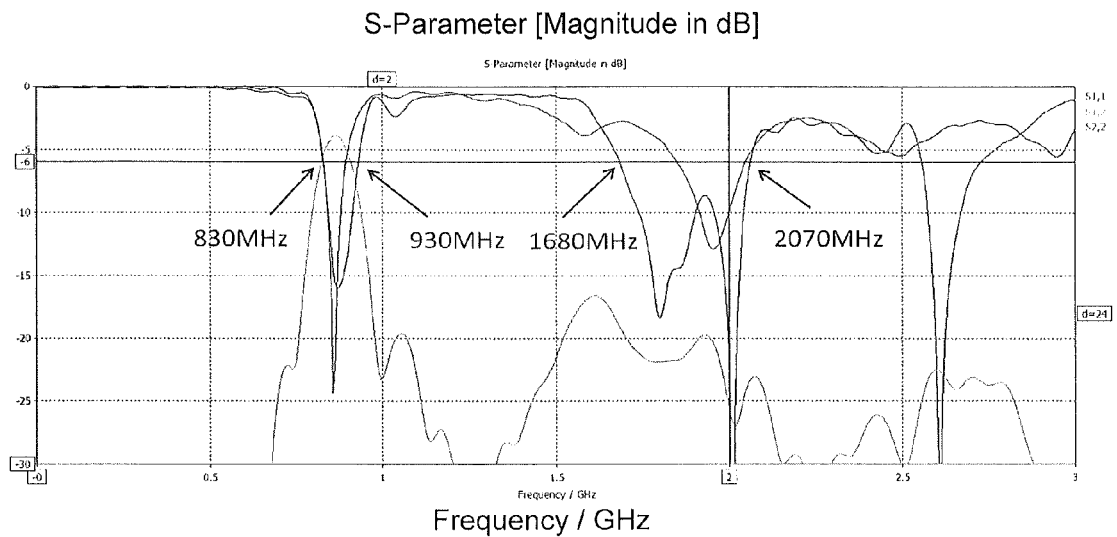
FIGS. 8-9 illustrate S-parameters of a double ring antenna of a wireless electronic device, according to various embodiments.

The integrated double antenna ring structure described above provides for many technical benefits, including improved performance efficiencies when the wireless device is held by a user. In FIG. 8, the S-parameter of the LTE MIMO antenna is shown. The bandwidth is defined as the frequency range where S11 is to be less than −6 dB. S11 represents how much power is reflected from the antenna, and is known as a reflection coefficient. The −6 dB bandwidth of main antenna (Port 2 412) can cover from 830 MHz to 930 MHz in lower LTE band and from 1680 MHz to 2070 MHz in LTE higher band. The diversity antenna (Port 1 402) can cover from 830 MHz to 900 MHz in lower LTE band, from 1800 MHz to 2060 MHz and from 2550 MHz to 2700 MHz in higher LTE band. The coupling (S12) is smaller than −4 dB in lower LTE band and −16 dB in higher LTE band.

Figure 9:
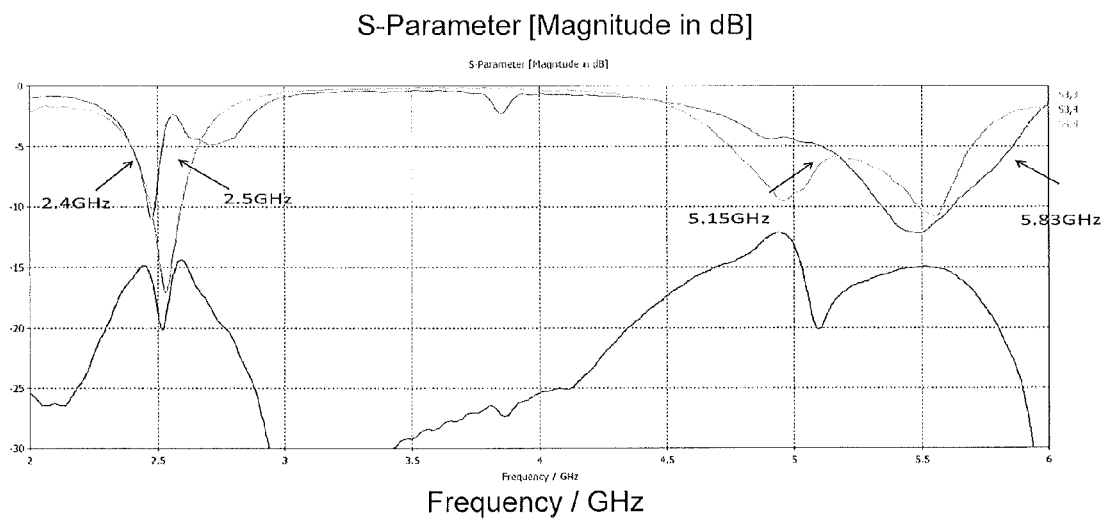
Figure 10A:
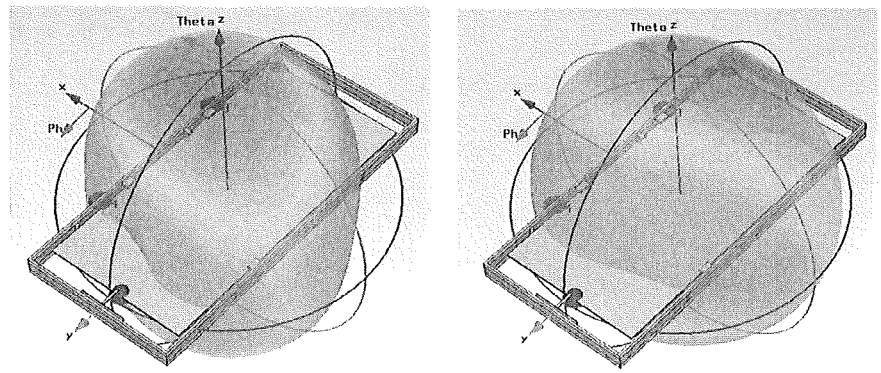
FIGS. 10A to 10F illustrate diagrams of envelope correlation coefficients (ECCs) of the double ring antenna, according to various embodiments.
Figure 10B:
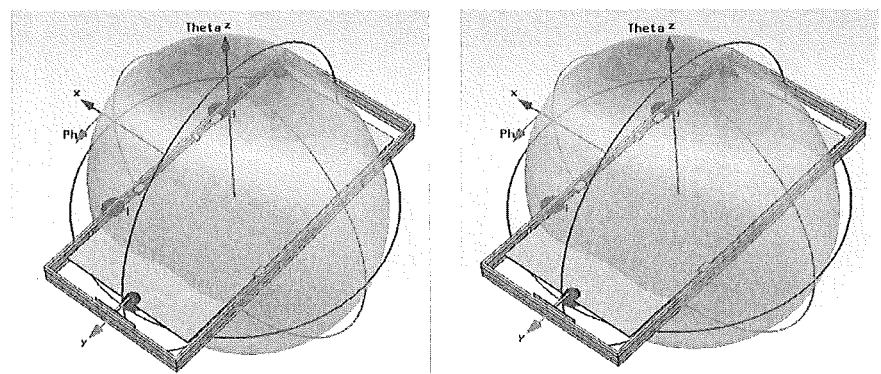
Figure 10C:
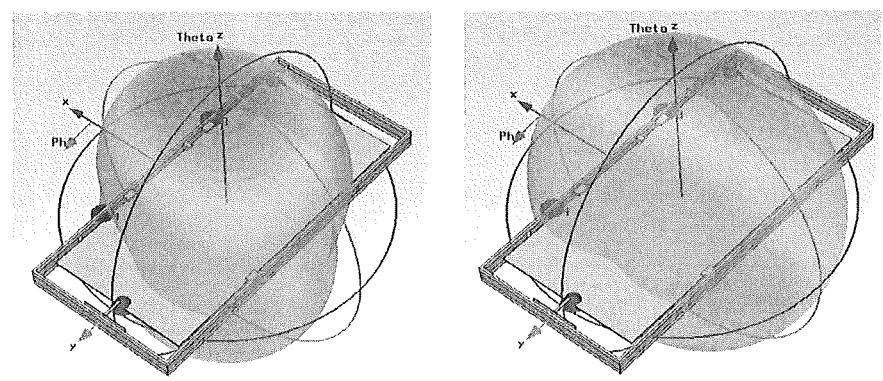
Figure 10D:
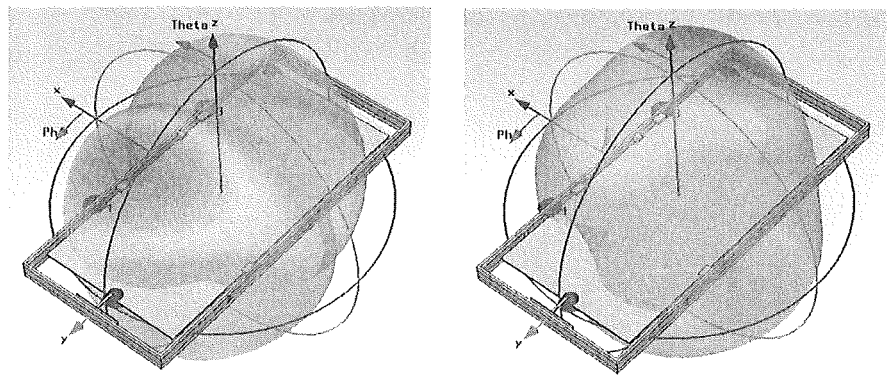
Figure 10E:
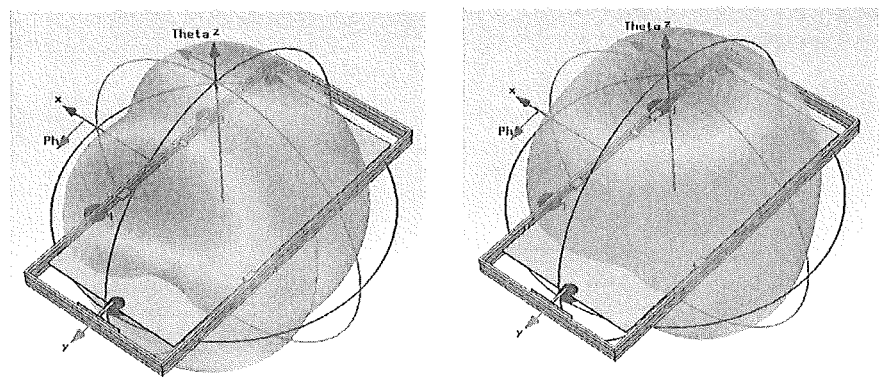
Figure 10F:
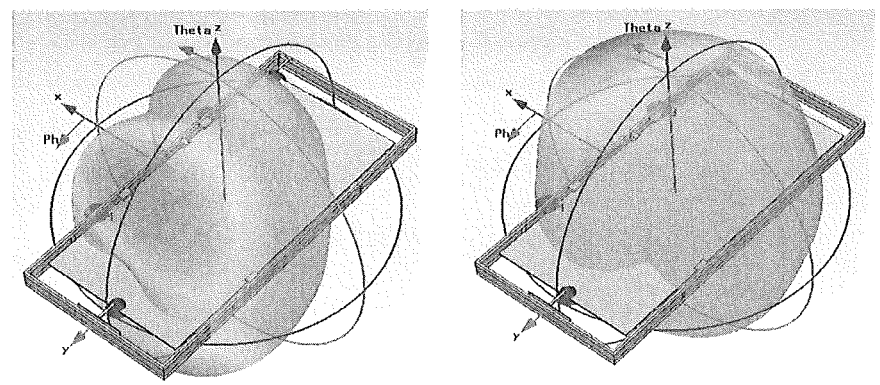

In FIG. 9, the S-parameter of MIMO Wi-Fi antenna is shown. The Wi-Fi antenna may easily satisfy the WLAN bandwidth (from 2.4 GHz to 2.5 GHz and from 5.2 GHz to 5.8 GHz). The MIMO Wi-Fi antenna can realize MIMO data transmission on all the Wi-Fi bands.

FIGS. 10A to 10F show diagrams of the envelope correlation coefficients (ECC) and efficiencies of the co-located LTE MIMO antenna. As shown in FIGS. 10A to 10F, the low ECC and high total efficiency within the operating bands may be achieved. The radiation pattern refers to the directional (angular) dependence of the strength of the radio waves from the antenna or other source. For some cases of the MIMO antenna, it may be advantageous that the radiation patterns of different ports point towards to different directions, which can reduce the correlation coefficient between these ports. The radiation patterns of the double ring LTE MIMO antenna in different frequencies are presented in Table 1, where it can be observed that the patterns of two antennas have been separated. This shows the reason for low correlation.

TABLE 1

| Frequency (GHz) | Port 1 Total Efficiency (dB) | Port 2 Total Efficiency (dB) | ECC |
|---|---|---|---|
| .82 | −5.47 | −6.48 | .08 |
| .84 | −4.08 | −4.94 | .07 |
| .86 | −3.37 | −3.82 | .14 |
| .88 | −3.34 | −3.01 | .28 |
| .9 | −3.92 | −2.49 | .42 |
| .92 | −5 | −2.43 | .49 |
| .94 | −6.5 | −3.16 | .43 |
| .96 | −8.2 | −5.09 | .23 |
| 1.7 | −3.94 | −2.99 | .04 |
| 1.8 | −2.6 | −1.9 | .03 |
| 1.9 | −1.16 | −1.45 | .01 |
| 2.0 | −.86 | −3.82 | .01 |
| 2.1 | −2.58 | −3.43 | .01 |
| 2.2 | −3.82 | −5.55 | .01 |
| 2.5 | −5 | N/A | N/A |
| 2.6 | −1.19 | N/A | N/A |
| 2.7 | −2.5 | N/A | N/A |

The total efficiency of an antenna relates to the power delivered to the antenna and the power radiated or dissipated within the antenna. A high efficiency antenna has most of the power present at the antenna's input radiated away. A low efficiency antenna has most of the power absorbed as losses within the antenna, or reflected away due to impedance mismatch. In practice, as the wireless data transmission rate depends on the strength of the signal, a higher efficiency antenna can transmit a stronger signal and achieve a higher data rate on average.

A correlation coefficient is a parameter to evaluate the correlation between the received (or transmitted) signals of the two ports. For MIMO antenna, it may be an important parameter as the capacity of the system may be reduced if the received signals in any of the different antenna elements are correlated. Thus, in many cases, it may be important to make the correlation coefficient of MIMO antenna lower. The industry currently requires the envelope correlation coefficient (ECC) to be lower than 0.5. In various embodiments describe herein, the ECC may be lower than 0.5 for all of the operation bands.

The total efficiency and ECC for co-located MIMO Wi-Fi antennas are shown in Table 2. It can be seen that, with the slot mode, the low envelope correlation coefficient (ECC) and high total efficiency within the operating bands has been achieved.

TABLE 2

| Frequency (GHz) | Port 3 Total Efficiency (dB) | Port 4 Total Efficiency (dB) | ECC |
|---|---|---|---|
| 2.4 | −3.37 | −4.34 | .05 |
| 2.42 | −3.08 | −3.87 | .05 |
| 2.44 | −2.67 | −3.4 | .05 |
| 2.45 | −2.43 | −3.16 | .04 |
| 2.46 | −2.20 | −2.90 | .04 |
| 2.48 | −2.00 | −2.55 | .04 |
| 2.5 | −2.34 | −2.55 | .04 |
| 5.1 | −2.22 | −1.36 | .01 |
| 5.2 | −1.69 | −1.63 | .02 |
| 5.4 | −.78 | −1.18 | .01 |
| 5.6 | −.86 | −.92 | .001 |
| 5.8 | −1.55 | −3.56 | .004 |

Figure 11:
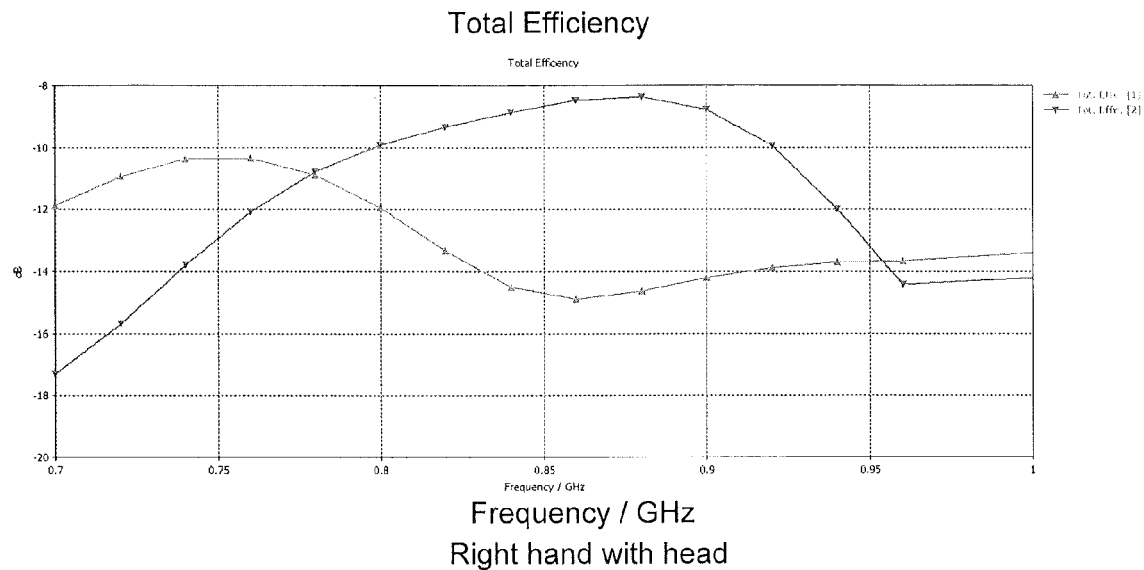
FIGS. 11-12 illustrate charts showing efficiencies of the double ring antenna, according to various embodiments
Figure 12:
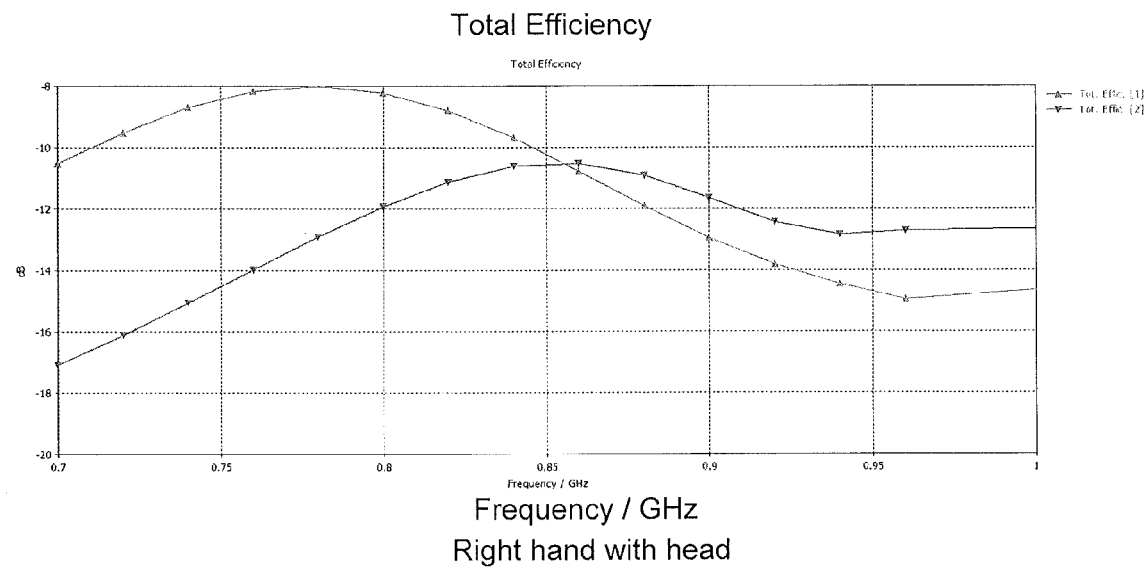
Figure 13:
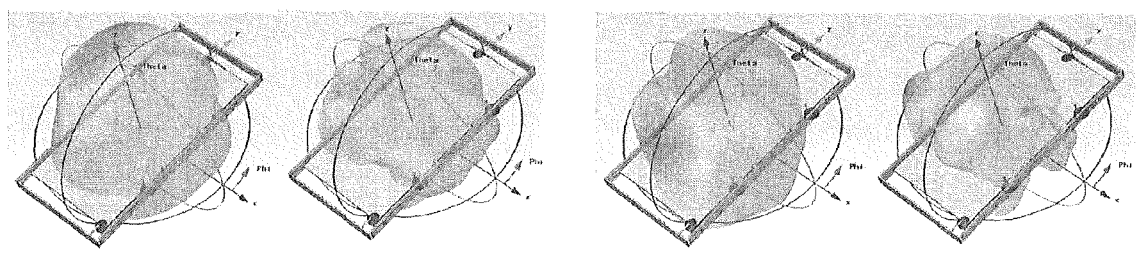
FIG. 13 illustrates a radiation pattern of the double ring antenna, according to various embodiments.

As the volume of radiator of LTE MIMO antenna in lower LTE band may be relatively larger than traditional mobile antenna, the body loss may be smaller. The total efficiency of LTE MIMO antenna in lower LTE band at talking position is shown in FIGS. 11 and 12. The average total efficiency loss may be around 6-7 dB. FIG. 13 illustrates a radiation pattern of the double ring antenna, according to various embodiments.

Metal ring 220 forms a metal frame with metal ring 210 to provide a robust structural space for integration of non-cellular antennas with the metals rings 210 and 220, such as for Wi-Fi antennas 520 and 530. Metal ring 220 may also act as a parasitic element to provide additional resonance in higher LTE bands. The metal rings 210 and 220, non-cellular antennas 520 and 530 and/or strip 202 may collectively define an outer surface around the perimeter of wireless electronic device 100.

According to some embodiments, metal ring 210, ground plane 470 and slot 450 may operate as a slot antenna for LTE lower band. Metal ring 210, ground plane 470 and slot 460 may operate as another LTE slot antenna. The use of slot antennas may provide less body loss, more robustness and better efficiency. Wi-Fi antennas 520 and 530 may also operate as slot antennas, as described above, to be less affected by the human body.

Antennas described herein may have a relatively larger volume, and when the wireless electronic device 100 is held by a user, the antennas may not be completely covered. It may be otherwise hard to put such a large volume antenna on a mobile device PCB, as may be done for conventional mobile phone antennas. This may help the described antennas to become more robust to interference caused by the human body.

Furthermore, a slot antenna may have a relatively weak electric field in the near field. The described use of slot antenna mode for LTE antennas may help the antennas to be "immune" to the human body. LTE slot antennas may be more robust in terms of performance when they are placed near a human.

Accordingly, various embodiments described herein may use a double ring antenna compactly integrated with non-cellular antennas within the double ring antenna to provide a smoother, more continuous look and feel to the exterior of a wireless electronic device and to provide multiple multi-band antenna systems with good performance characteristics. The antennas described in the embodiments above may have better radiation performance when the mobile device is proximate to the human body. The total efficiency may drop only 6-7 dB on average in the talking position, which may be much lower than conventional antenna design (8-12 dB).

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. An antenna system of a wireless electronic device, comprising:
   a first antenna ring extending around a perimeter of the wireless electronic device;

a second antenna ring extending around the perimeter of the wireless electronic device spaced apart from the first antenna ring;
a first connector portion electrically connecting the first antenna ring to the second antenna ring at the perimeter of the wireless electronic device;
a ground plane in the wireless electronic device, wherein the first and second antenna rings are spaced apart from the ground plane;
a first port at the ground plane configured to feed a first electrical signal to the first antenna ring; and
a first ground element electrically connecting the first antenna ring to the ground plane,
wherein a portion of the first antenna ring between the first port and the first ground element and a portion of the ground plane between the first ground element and the first port form a first conductive pattern for the first electrical signal around a first slot, wherein the first slot is a first nonconductive space.

2. The antenna system of claim 1, further comprising:
a second port at the ground plane configured to feed a second electrical signal to the first antenna ring; and
a second ground element electrically connecting the first antenna ring to the ground plane.

3. The antenna system of claim 2, wherein a portion of the ground plane between the second port and the second ground element, a portion of the first antenna ring between the second ground element and the first ground element, and a portion of the ground plane between the first ground element and the second port form a second conductive pattern for the second electrical signal around a second slot, wherein the second slot comprises a second nonconductive space.

4. The antenna system of claim 1, further comprising:
a second connector portion electrically connecting the first antenna ring to the second antenna ring at the perimeter of the wireless electronic device, wherein the first connector portion, the first antenna ring between the first and second connector portions, the second connector portion, and the second antenna ring between the second connector portion and the first connector portion form a first integrated conductive pattern.

5. The antenna system of claim 1, further comprising:
a third connector portion electrically connecting the first antenna ring to the second antenna ring at the perimeter of the wireless electronic device, wherein the second connector portion, the first antenna ring between the second and third connector portions, the third connector portion, and the second antenna ring between the third connector portion and the second connector portion form a second integrated conductive pattern.

6. The antenna system of claim 5, further comprising:
a ground element electrically connected to the ground plane at the second connector portion and configured to reduce coupling between the first and second integrated conductive patterns.

7. The antenna system of claim 1, wherein the perimeter of the wireless electronic device surrounds first and second primary surfaces of the wireless electronic device, wherein the first or second primary surface includes a display, and wherein the first antenna ring contacts the first primary surface and the second antenna ring contacts the second primary surface.

8. A wireless electronic device, comprising:
a ground plane;
a double ring antenna, comprising,
a first antenna ring extending around a perimeter of the ground plane and spaced apart from the ground plane,
a second antenna ring extending around the perimeter of the ground plane and spaced apart from the first antenna ring and the ground plane,
a first connector portion electrically connecting the first antenna ring to the second antenna ring;
a transceiver circuit coupled to the ground plane and configured to provide a first electrical signal and a second electrical signal to ports of the double ring antenna;
a first port at the ground plane configured to feed the first electrical signal from the transceiver circuit to the first antenna ring; and
a first ground element electrically connecting the first antenna ring to the ground plane, wherein the first antenna ring between the first port and the first ground element and the ground plane between the first ground element and the first port form a first conductive pattern for the first electrical signal around a first slot, wherein the first conductive pattern and the first slot define a first cellular antenna configured to radiate a third electrical signal responsive to the first electrical signal.

9. The wireless electronic device of claim 8, wherein the double ring antenna is configured to operate with the transceiver circuit as a multiple-in-multiple-out (MIMO) antenna.

10. The wireless electronic device of claim 8, wherein the double-ring antenna is configured to operate, responsive to the first and second electrical signals from the transceiver circuit, as a half wave antenna for a long term evolution (LTE) high band, a half wave antenna for an LTE low band, and/or a full wave antenna for the LTE high band.

11. The wireless electronic device of claim 8, further comprising:
a second port at the ground plane configured to feed the second electrical signal from the transceiver circuit to the first antenna ring; and
a second ground element electrically connecting the first antenna ring to the ground plane,
wherein the ground plane between the second port and the second ground element, the first antenna ring between the second ground element and the first ground element, and the ground plane between the first ground element and the second port form a second conductive pattern for the second electrical signal around a second slot, wherein the second conductive pattern and the second slot define a second cellular antenna configured to radiate a fourth signal responsive to the second electrical signal.

12. The wireless electronic device of claim 11, wherein the first cellular antenna is configured to operate with the transceiver circuit as a diversity antenna, and wherein the second cellular antenna is configured to operate with the transceiver circuit as a main antenna according to a carrier aggregation standard.

13. The wireless electronic device of claim 11, wherein the transceiver circuit, the first cellular antenna and the second cellular antenna are configured to provide communications for the wireless electronic device via a plurality of frequency bands according to a long term evolution (LTE)-Advanced standard.

14. The wireless electronic device of claim 11, further comprising:
a second connector portion electrically connecting the first antenna ring to the second antenna ring at the perimeter of the wireless electronic device, wherein the first connector portion, the first antenna ring between the first and second connector portions, the second connector portion, and the second antenna ring between the second connector portion and the first connector portion form a third conductive pattern around a first integrated nonconductive space, and wherein the third conductive pattern and the first integrated nonconductive space define a first non-cellular antenna; and a third port configured to feed a fifth electrical signal from the transceiver circuit to the third conductive pattern.

15. The wireless electronic device of claim 14, further comprising:

a third connector portion electrically connecting the first antenna ring to the second antenna ring at the perimeter of the wireless electronic device, wherein the second connector portion, the first antenna ring between the second and third connector portions, the third connector portion, and the second antenna ring between the third connector portion and the second connector portion form a fourth conductive pattern around a second integrated nonconductive space, and wherein the fourth conductive pattern and the second integrated nonconductive space define a second non-cellular antenna; and a fourth port configured to feed a sixth electrical signal from the transceiver circuit to the fourth conductive pattern.

16. The wireless electronic device of claim 15, wherein the transceiver circuit, the first non-cellular antenna and the second non-cellular antenna are configured to provide communications for the wireless electronic device according to a Wi-Fi standard and/or Bluetooth® standard.

17. The wireless electronic device of claim 15, wherein the first non-cellular antenna and the second non-cellular antenna are configured to operate with the transceiver circuit as a multiple-in-multiple-out (MIMO) antenna.

* * * * *